United States Patent Office 2,790,793
Patented Apr. 30, 1957

2,790,793
PROCESS FOR OBTAINING PURE CHESTNUT-SAPONIN

Friedrich Boedecker, Berlin-Dahlem, Germany, assignor to Riedel-De Haën Aktiengesellschaft, Seelze, near Hannover, Germany, a corporation of Germany No Drawing. Application March 3, 1953,
Serial No. 340,145

Claims priority, application Germany October 31, 1952

3 Claims. (Cl. 260—210.5)

This invention relates to the preparation of purified extracts of chestnut-saponin from aqueous alcoholic solutions of the crude material.

It is known that chestnut-saponin may be obtained from the fruits of Aesculus hippocastanum or the wild chestnut by the utilization of suitable organic extraction solvents, such as aqueous low aliphatic alcohols. However, the saponin resulting therefrom is very impure. The impurities in the saponin give the latter its adhesiveness and consistency, which renders further processing quite difficult, particularly when using the saponin for pharmaceutical preparations.

The present invention relates to a novel process for obtaining chestnut-saponin and has, therefore, as one of its objects to provide means for thoroughly extracting a pure substantially solid chestnut-saponin which has a very low adhesiveness and consistency from the fruits of Aesculus hippocastanum by means of a new method and while employing aqueous organic solvents.

It is a further object of the invention to thoroughly extract from Aesculus hippocastanum a pure, solid but pulverizable chestnut-saponin suitable for processing and especially good for pharmaceutical use by treating Aesculus hippocastanum with aqueous organic solvents, for instance, aqueous methyl alcohol, to thereby obtain a crude chestnut-saponin extract which is treated, after the organic components of the solvents used have been removed, with a second organic solvent which may be partially miscible with water, for instance, methyl-ethyl-ketone, in order to obtain substantially complete removal of the impurities into the organic solvent, and then evaporating the water in order to dry the resulting pure chestnut-saponin.

The pure aqueous saponin solution which exists after the crude saponin solution is extracted, and before the final evaporating step of the pure solution to solid saponin, tends to foam a great deal. Therefore, it is necessary during the final evaporating step to use either special foam preventives or special drying means such as vaporizers or similar dryers.

It is, therefore, a still further object of this invention to prevent the foaming of pure and aqueous saponin solution by evaporating the solution after adding thereto a small amount of an organic solvent which may be mixed with water, for instance, methyl alcohol, and which remains in solution until a high percentage concentrate is obtained; and then withdrawing the last remaining traces of moisture from this highly concentrated solution in a vacuum or by appropriate means. Such vacuum treatment causes the chestnut-saponin to swell up like a solid foam.

There is obtained as a result of the aforesaid processing of Aesculus hippocastanum, a pulverizable, non-adhesive and stable chestnut-saponin product which remains stable while not exposed to moisture and which has the consistency of a solid foam. This product is very suitable for further processing, for example, with the processing of products containing either halide derivatives of the 8-oxy-quinoline or 8-oxy-quinaldine, or carrier materials such as aluminum oxide or aluminum hydroxide, to obtain solid, non-hygroscopic pharmaceutical substances.

This special property and adaptability to further processing of the product which results from the said purification of the resulting product is essential, since highly purified saponin, as such, is also greatly hygroscopic, and since the latter may not be utilized as a solid finished substance without further addition of other substances.

An example illustrating the process is set forth below and must be considered purely illustrative, without thereby unduly restricting the scope of the invention:

A pure chestnut-saponin extract is produced by using aqueous methyl alcohol. The methyl alcohol is withdrawn from the resulting solution in order to obtain an extract of approximately 50% concentration. 3 kilograms of said extract are thoroughly mixed with 2 liters of methyl-ethyl-ketone in order to obtain a second solution. The second solution is thereafter purified in a column through counter-flow with 12 liters of methyl-ethyl-ketone, resulting in an aqueous saponin solution which yields, after vaporization and complete drying in a vacuum, a loose but solid mass of saponin weighing approximately 950 grams, which may be easily pulverized.

Although one embodiment of the invention has been described, it should be noted that the invention may be realized in modified form, as may readily occur to persons skilled in the art without constituting a departure from the spirit and scope of the invention as defined in the objects and in the appended claims.

Having thus described the invention, what is claimed as new and desired to be secured by Letters Patent, is:

1. A process for manufacturing pure, solid and easily pulverizable chestnut-saponin from an aqueous lower alkanol extract of Aesculus hippocastanum which comprises the steps of removing the lower alkanol from the crude solution, treating the aqueous concentrated chestnut-saponin extract with methyl ethyl ketone of limited water-miscibility to effect a stratification wherein the impurities are preferentially contained in the layer, of methyl ethyl ketone, removing said methyl ethyl ketone layer, adding a small amount of a water-miscible lower alkanol to remaining aqueous layer containing the chestnut-saponin extract, and evaporating the water to obtain a solid, loose mass of pure chestnut-saponin.

2. A process for manufacturing pure, solid and easily pulverizable chestnut-saponin from a methanol extract of Aesculus hippocastanum which comprises the steps of removing the methanol from the crude solution, treating the aqueous concentrated chestnut-saponin extract with methyl ethyl ketone to effect a stratification wherein the impurities are preferentially contained in said methyl ethyl ketone layer, removing said methyl ethyl ketone layer, adding a small amount of a water-miscible lower alkanol to said aqueous layer containing the chestnut-saponin extract, and evaporating the water to obtain a solid, loose mass of pure chestnut-saponin.

3. A process according to claim 2, wherein the final evaporation includes a vacuum treatment to remove substantially all traces of solvent.

References Cited in the file of this patent

UNITED STATES PATENTS

| | | |
|---|---|---|
| 2,224,804 | Wolf | Dec. 10, 1940 |
| 2,500,173 | Gisvold | Mar. 14, 1950 |
| 2,534,260 | Gisvold | Dec. 19, 1950 |